United States Patent
Thrun et al.

(10) Patent No.: US 10,101,035 B1
(45) Date of Patent: Oct. 16, 2018

(54) CUSTOM COOKING PROGRAM BASED ON FEEDBACK

(71) Applicant: Silicon Valley Factory LLC, Los Altos Hills, CA (US)

(72) Inventors: Sebastian Thrun, Los Altos, CA (US); David St. Martin, San Rafael, CA (US); Arash Kani, Roxbury, MA (US)

(73) Assignee: Silicon Valley Factory LLC, Los Altos Hills, CA (US)

( * ) Notice: Subject to any disclaimer, the term of this patent is extended or adjusted under 35 U.S.C. 154(b) by 0 days.

(21) Appl. No.: 15/489,478

(22) Filed: Apr. 17, 2017

(51) Int. Cl.
*H05B 1/02* (2006.01)
*F24C 7/08* (2006.01)
*G06K 7/10* (2006.01)
*G06F 17/30* (2006.01)

(52) U.S. Cl.
CPC ........ *F24C 7/087* (2013.01); *G06F 17/30879* (2013.01); *G06K 7/10297* (2013.01)

(58) Field of Classification Search
CPC .............. F24C 7/087; G06F 17/30879; G06K 7/10297; H05B 1/0262; H05B 1/0261; H05B 3/0076; H05B 6/6447
USPC ....... 219/494, 497, 506, 441, 412–414, 490, 219/714, 713
See application file for complete search history.

(56) References Cited

U.S. PATENT DOCUMENTS

| | | |
|---|---|---|
| 3,530,499 A | 9/1970 | Schroeder |
| 4,323,773 A | 4/1982 | Carpenter |
| 4,381,438 A | 4/1983 | Goessler |
| 4,749,836 A | 6/1988 | Matsuo et al. |
| 4,913,038 A * | 4/1990 | Burkett ............... A47J 37/1266 99/329 R |
| 5,045,333 A | 9/1991 | Petrofsky |
| 5,877,477 A * | 3/1999 | Petty ...................... F24C 7/087 219/413 |
| 6,660,983 B2 | 12/2003 | Monforton |
| 6,740,855 B1 | 5/2004 | Decobert |
| 8,191,465 B2 | 6/2012 | Sager |
| 8,207,479 B2 | 6/2012 | Ben-Shmuel |
| 8,835,816 B2 | 9/2014 | McIntyre |

(Continued)

FOREIGN PATENT DOCUMENTS

| | | |
|---|---|---|
| EP | 1422163 | 5/2004 |
| JP | 2006153432 | 6/2006 |

OTHER PUBLICATIONS

Author Unknown, "Induction Heating", from Wikipedia, the free encyclopedia. Last modified Jan. 10, 2017.

(Continued)

*Primary Examiner* — Mark Paschall
(74) *Attorney, Agent, or Firm* — Van Pelt, Yi & James LLP

(57) ABSTRACT

In various embodiments, a method of decoding and executing a custom coding program based on feedback includes using a heating apparatus to execute a first phase of a plurality of heating phases, the first phase having an associated prescribed time to perform the first phase, and receiving at least one sensor reading associated with the first phase. If the at least one sensor reading indicates that the first phase is complete, proceeding to a next phase of the plurality of heating phases. If the at least one sensor reading indicates that the first phase is incomplete, instructing the heating apparatus to extend the prescribed time to perform the first phase.

19 Claims, 7 Drawing Sheets

(56) References Cited

U.S. PATENT DOCUMENTS

| | | | |
|---|---|---|---|
| 9,414,442 B2* | 8/2016 | Torres | B65D 81/3446 |
| 9,528,972 B2* | 12/2016 | Minvielle | G01N 33/02 |
| 9,606,522 B2* | 3/2017 | Hoffman | G05B 19/042 |
| 9,644,847 B2* | 5/2017 | Bhogal | F24C 7/086 |
| 2004/0018278 A1 | 1/2004 | Popplewell | |
| 2007/0092670 A1 | 4/2007 | Quella | |
| 2007/0137633 A1 | 6/2007 | McFadden | |
| 2007/0278221 A1 | 12/2007 | Skaife | |
| 2008/0083338 A1 | 4/2008 | Niemetz | |
| 2008/0105134 A1 | 5/2008 | Elston, III | |
| 2008/0108388 A1 | 5/2008 | Ebrom | |
| 2009/0188396 A1 | 7/2009 | Hofmann | |
| 2009/0194526 A1 | 8/2009 | Buchanan | |
| 2009/0208615 A1 | 8/2009 | Domingues | |
| 2009/0236334 A1 | 9/2009 | Ben-Shmuel | |
| 2010/0213187 A1 | 8/2010 | Bandholz | |
| 2010/0320189 A1 | 12/2010 | Buchheit | |
| 2011/0303652 A1 | 12/2011 | Sano | |
| 2012/0063753 A1 | 3/2012 | Cochran | |
| 2013/0092032 A1 | 4/2013 | Cafferty | |
| 2013/0269539 A1 | 10/2013 | Polt | |
| 2013/0306627 A1 | 11/2013 | Libman | |
| 2014/0263640 A1 | 9/2014 | Heit | |
| 2014/0377417 A1 | 12/2014 | Martinez | |
| 2015/0057773 A1* | 2/2015 | Minvielle | G05B 15/02 |
| | | | 700/90 |
| 2016/0198885 A1 | 7/2016 | Logan | |
| 2016/0220064 A1 | 8/2016 | Young | |
| 2016/0295640 A1 | 10/2016 | De Samber | |
| 2016/0327279 A1 | 11/2016 | Bhogal | |
| 2016/0355287 A1 | 12/2016 | Keller | |
| 2017/0016623 A1 | 1/2017 | Rabie | |
| 2017/0135383 A1 | 5/2017 | Liss | |

OTHER PUBLICATIONS

Butz et al., "Recent Developments in Noninvasive Techniques for Fresh Fruit and Vegetable Internal Quality Analysis", from R: Concise Reviews in Food Science, published Nov. 21, 2005.

RF Solid-State Technology with Goji. http://www.gojifoodsolutions.com/rf-cooking-technology. Jan. 29, 2017.

Translation of JP2006153432A, Nozawa et al, Heating Cooker Information medium and program, Jun. 15, 2006, ProQuest, Mar. 25, 2018.

* cited by examiner

100

200

300

400

500

800

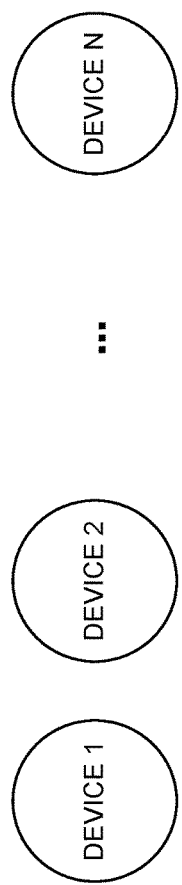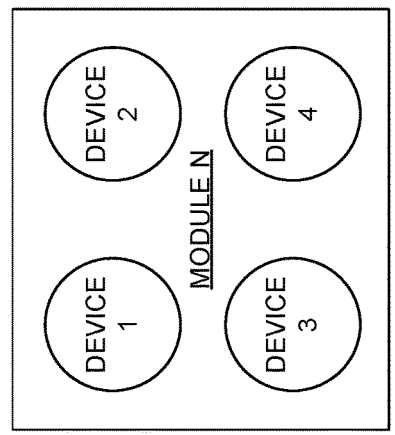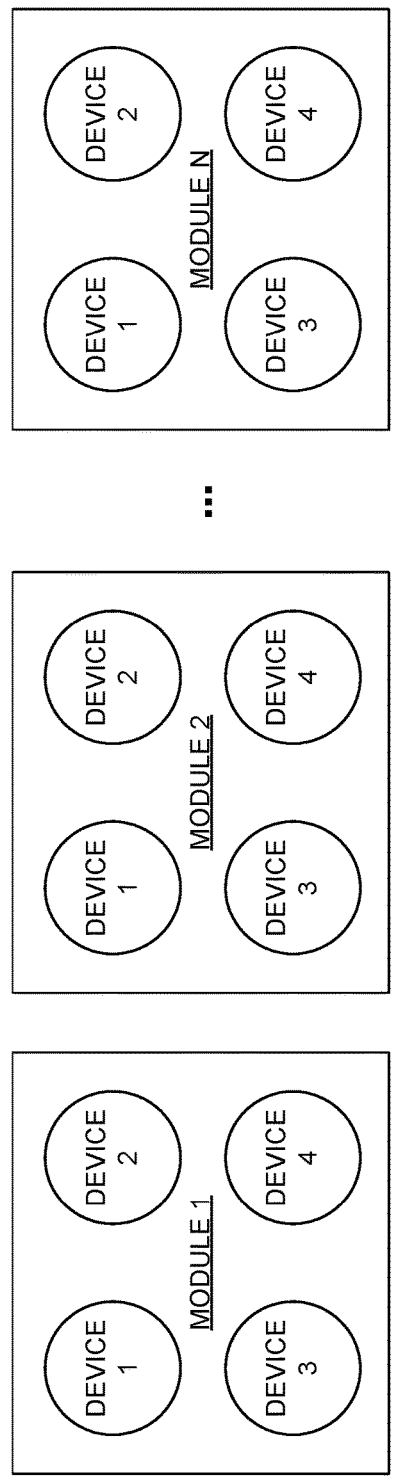

CUSTOM COOKING PROGRAM BASED ON FEEDBACK

BACKGROUND OF THE INVENTION

There are many challenges in food preparation. Cooking can be time-consuming and messy. For example, ingredient selection, acquisition, transportation, and preparation can be inconvenient. In spite of the effort expended, sometimes the results of meal preparation are unsatisfying. Successfully extracting flavors from ingredients typically requires lengthy cooking processes such as stewing or skilled processes such as browning. The final tastiness of food depends on the characteristics of the ingredients and a person's tastes and preferences.

Pre-packaged chilled convenience meals have been popular since the 1950s for its ease of preparation. Typical convenience meals are packaged in a tray and frozen. The consumer heats the meal in an oven or microwave and consumes the food directly from the tray. However, conventional pre-packaged convenience meals might be unhealthy and not tasty, and results may vary depending on the microwave or oven used to heat the meal. For example, the food might be heated unevenly.

BRIEF DESCRIPTION OF THE DRAWINGS

Various embodiments of the invention are disclosed in the following detailed description and the accompanying drawings.

FIG. 9A is a block diagram illustrating an embodiment of a modular heating system.

FIG. 9B is a block diagram illustrating an embodiment of a modular heating system.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method of decoding and executing a custom cooking program based on feedback is disclosed. In various embodiments, a heating apparatus is used to execute a first phase of a plurality of heating phases, where the first phase has an associated prescribed time to perform the first phase. At least one sensor reading associated with the first phase is received. If the at least one sensor reading indicates that the first phase is complete, the method proceeds to a next phase of the plurality of heating phases. If the at least one sensor reading indicates that the first phase is incomplete, the heating apparatus is instructed to extend the prescribed time to perform the first phase.

Figure 1:
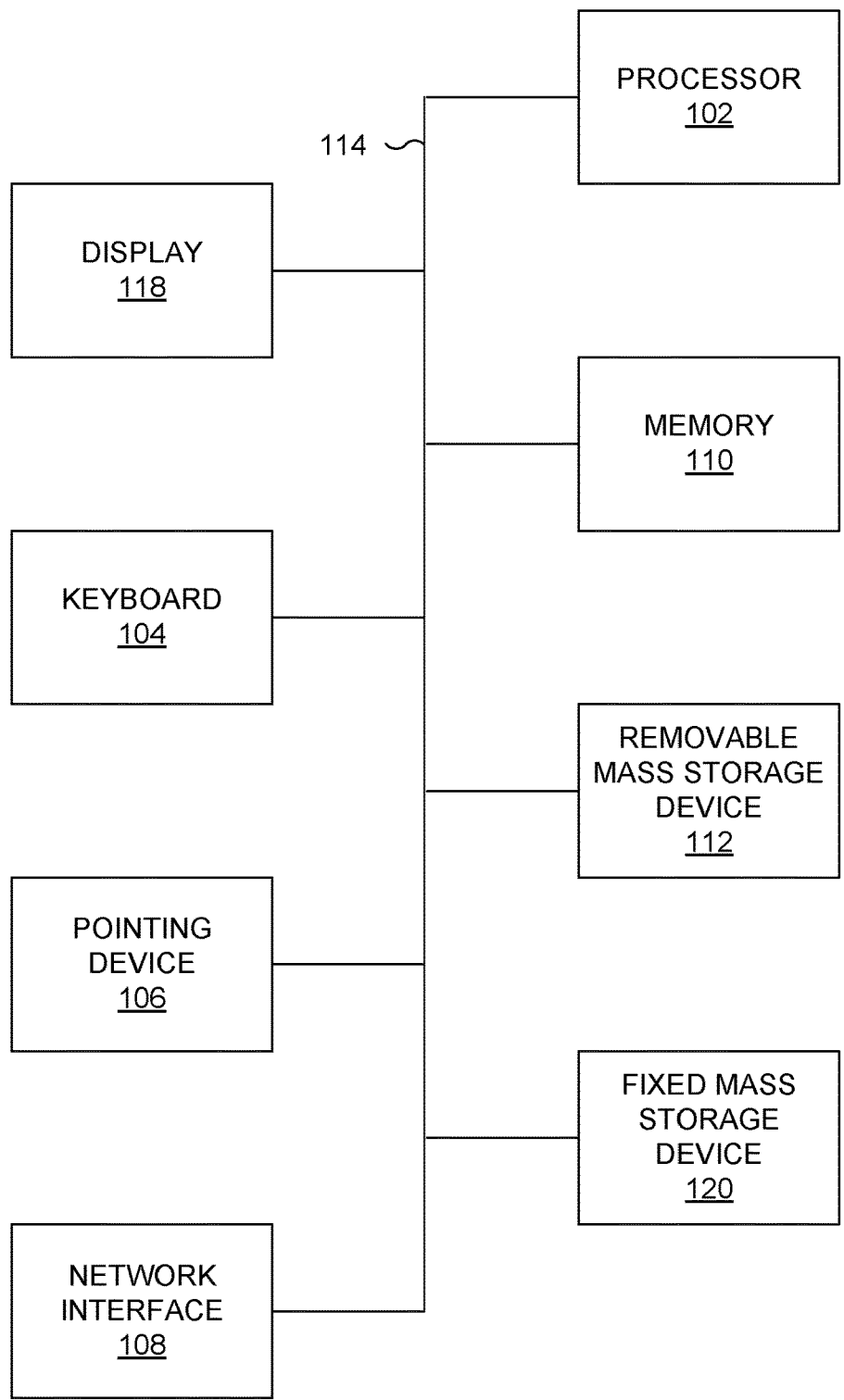
FIG. 1 is a functional diagram illustrating a programmed computer system for decoding and executing a custom cooking program based on feedback in accordance with some embodiments.

FIG. 1 is a functional diagram illustrating a programmed computer system for decoding and executing a custom cooking program based on feedback in accordance with some embodiments. As will be apparent, other computer system architectures and configurations can be used to decode and execute a custom cooking program based on feedback. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to execute/perform the processes described below with respect to FIGS. 2 and 4.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
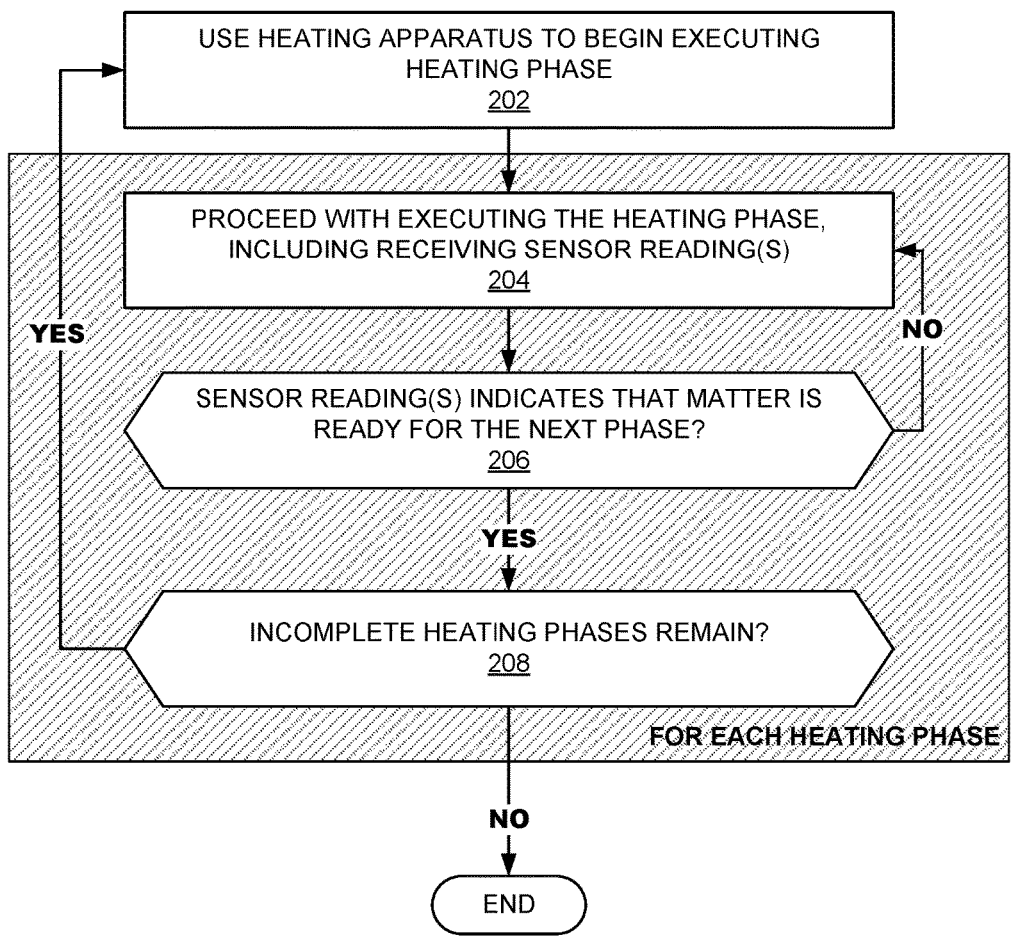
FIG. 2 is a flowchart illustrating an embodiment of a process to decode a custom cooking program based on feedback.

FIG. 2 is a flowchart illustrating an embodiment of a process 200 to decode a custom cooking program based on feedback. In various embodiments, the custom cooking program is adapted for contents of a package such as contents of package 500 of FIG. 5. In various embodiments, the process 200 may be implemented by a processor such as processor 102 of FIG. 1, controller 608 of FIG. 6, or controller 708 of FIG. 7.

At 202, a heating apparatus is used to begin executing a heating phase. For example, a controller of the heating apparatus may execute the heating phases as further described herein with respect to FIGS. 6-8. In various embodiments, an electromagnetic (EM) source is instructed to energize at a specific time to carry out the heating phases. For example, in various embodiments, EM source 602 is energized at an appropriate frequency and time to effect the pre-defined energy level for a pre-defined duration for a phase as further described herein with respect to FIG. 6. In various embodiments, typical recipes are completed within three minutes and may include one or more phases.

At 204, the heating phase proceeds. In various embodiments, the execution of the heating phase includes receiving one or more sensor readings. The sensor reading(s) may be used to adjust the cooking process to account for natural variations in the food. For example, a duration and/or energy level of a phase can be altered/extended/shortened from a baseline recipe to optimize the result for a particular piece of food.

The sensor readings may be collected by a variety of sensors. For example, the sensors may be provided in a heating apparatus such as heating apparatus 600 of FIG. 6 as further described herein. In some embodiments, at least one sensor is provided in chamber 500 of FIG. 5. In various embodiments, the sensor readings include a sound. The sound may indicate a state of the food being heated. In various embodiments, the sensor readings include an image. Aspects of the image such as color may indicate a state of the food being heated. In various embodiments, the sensor readings include a pressure level. The pressure may indicate whether a target environment in the cooking chamber has been reached. In various embodiments, the sensor readings include a moisture level. The moisture level may indicate whether to provide more moisture or absorb excess moisture. Moisture inside a heating apparatus chamber may be adjusted using a membrane as further described herein with respect to FIG. 5.

At 206, it is determined whether sensor readings indicate that matter is ready for the next phase. For example, a microphone recording may be compared to a sound signature. Food that has reached a particular point in a cooking method (e.g., boiling, sizzling, frying, etc.) may have a distinctive sound indicating a change in the structure or texture of the food. In various embodiments, when a sensed sound matches a sound profile, it is determined that the food is ready for the next phase.

Using the example of imaging, a color change in food may indicate completion of a phase. For example, the color of green vegetables may change as they are steamed and become tender. The change in color or a current color of the food may be compared to a profile to determine whether a phase is complete. In various embodiments, when a sensed image matches a color profile, it is determined that the food is ready for the next phase.

Using the example of temperature, a temperature of the food may indicate completion of a phase or beginning of a phase. For some meats, the temperature in a specific portion matching a threshold temperature indicates that the meat is safe for consumption. In some embodiments, when a specific temperature is reached, a phase may be sustained for a pre-defined period of time. For example, when a recipe calls for baking at a particular temperature for a duration of time, the temperature reading can establish the start time for measurement of the duration of bake time. In various embodiments, the temperature may be measured non-invasively.

Using the example of pressure, a pressure of food may indicate completion of a phase. The pressure may indicate whether a target environment in the cooking chamber has been reached. In some embodiments, when a specific pressure is reached, a phase may be sustained for a pre-defined period of time. For example, when a recipe calls for cooking at a particular pressure for a duration of time, the pressure reading can establish the start time for measurement of the duration of cook time.

In various embodiments, the determination of whether food is ready for the next phase is based on machine learning. For example, user feedback may be collected. The user feedback may be analyzed for a particular type of food and/or for a particular user. For example, a user may be asked about their satisfaction with the food and/or with the characteristics of the food. The user may rate the tenderness of the food. In some embodiments, the feedback is analyzed to adjust cooking techniques for a particular type of food, e.g., leafy greens, carrots, fish, steak, etc. In some embodiments, the feedback is analyzed to adjust cooking techniques for a particular user. For example, cooking techniques may be adapted to a particular user's taste and preferences. In various embodiments, the analysis of user feedback is performed at a central database. One or more cooking schedules may be stored for each type of food and the cooking schedules may be adjusted based on the user feedback. For example, if a threshold percentage of users are dissatisfied (this may indicate that the food is not tender, too salty, etc.) with a result of a particular cooking schedule, the cooking schedule may be adjusted and the users surveyed to determine whether an adjustment is an improvement.

If the food is not ready for the next phase, the heating apparatus is instructed to extend the prescribed time to perform the current phase. The process 200 returns to 204 in which the contents of the heating apparatus are continued to be monitored by receiving sensor readings. For example, this may extend the time to perform a current phase, e.g., maintaining a current energy level, while additional sensor readings are collected. In various embodiments, a particular phase is extended subject to a time limit. For example, even if sensor readings indicate that the food is not ready for the next phase, if the time limit is met, then the process may proceed to the next phase. This may prevent food from being overcooked due to a faulty sensor reading reporting that food is not ready for the next phase.

If the food is ready for the next phase, it is determined whether any incomplete heating phases remain (208). If no incomplete heating phases remain, the process ends. If there are any incomplete heating phases, the process 200 returns to 202 in which the heating apparatus is instructed to begin executing a next heating phase.

In various embodiments, 204-208 is performed for each heating phase. In various embodiments, prior to 202, heating phases are determined. For example, heating phases are determined by reading encoded heating instructions. In some embodiments, the instructions are obtained from reading an electronic tag. For example, an electronic tag reader such as reader 606 of heating apparatus 600 of FIG. 6 scans an electronic tag 524 of a package 500 of FIG. 5. In some embodiments, heating instructions are embedded in the electronic tag and an Internet connection is not needed to prepare food using the heating instructions. In some embodiments, instructions are requested from a remote server based on an identification of the packaged food. The identification of the packaged food may be determined by scanning an electronic tag such as tag 524 of package 500 of FIG. 5.

Heating phases may be determined based on the read instructions. The instructions may include a heating schedule having one or more phases, each phase having a pre-defined duration and energy level. In various embodiments, heating instructions include one or more phases, duration of each phase, and energy level for each phase, etc. For example, the heating instructions are provided as a recipe or schedule in which the food is heated at a particular temperature/energy for a defined duration of time. An example of a heating schedule is shown in FIG. 3.

In various embodiments, a heating apparatus used to execute a heating phase is part of a system of a plurality of heating apparatus is instructed to execute the determined heating phases in a coordinated manner. For example, the heating apparatus may delay beginning of a first heating phase such that the heating process ends at substantially the same time as another heating apparatus. As another example, the heating apparatus may delay beginning of a first heating phase such that the heating apparatus ends at a pre-defined time before or after at least one other heating apparatus. An example of a heating system with a plurality of modules is further described herein with respect to FIGS. 9A and 9B.

Figure 3:
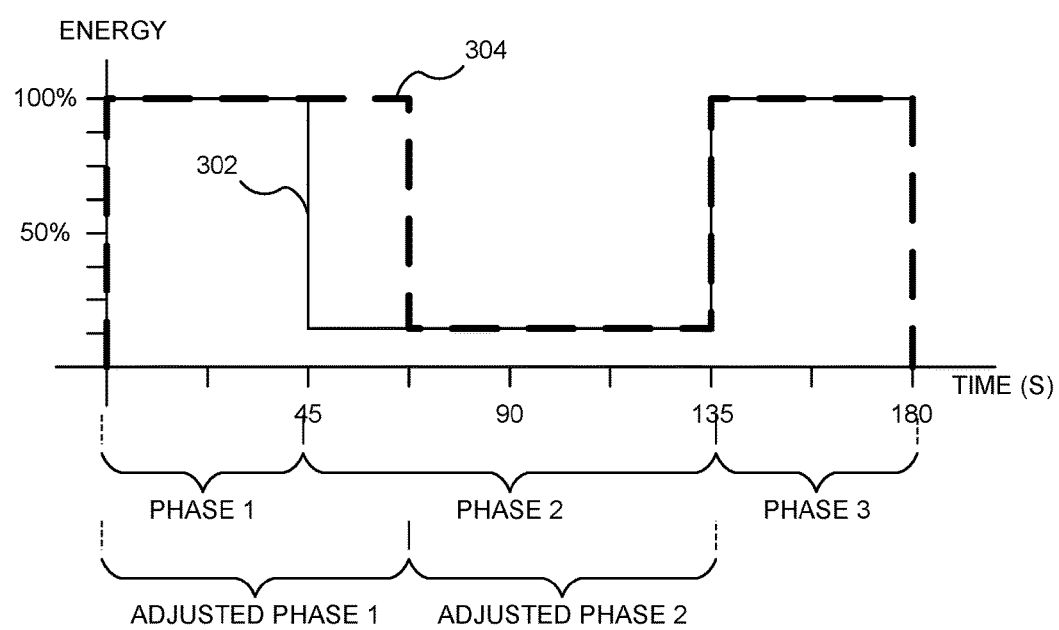
FIG. 3 is a block diagram illustrating an embodiment of a heating schedule adapted based on feedback.

FIG. 3 is a block diagram illustrating an embodiment of a heating schedule 300 adapted based on feedback. The cooking schedule may be determined and/or adjusted based on sensor reading feedback. In this example, the cooking schedule is represented by a graph, where the x-axis is time in seconds and the y-axis is energy level. The energy level is given by the energy that a heating apparatus is capable of providing, e.g., field per unit volume of the material being heated up, heat per unit volume of material, temperature.

The example of FIG. 3 includes a baseline/default heating schedule 302 and a heating schedule adapted based on feedback 304. Using the example of cooking steak, suppose that at time 45 seconds, the food is not yet ready for the next phase. For example, an image of the steak may indicate the color of the steak is not as dark as the steak is expected to be at the end of Phase 1. Phase 1 can be extended. In this example, adjusted Phase 1 lasts until around 67.5 seconds. In this example, sensor reading(s) taken at 67.5 seconds indicate that the steak is sufficiently dark and the steak is ready for Phase 2. The controller then instructs the heating apparatus to begin executing Phase 2, e.g., changing an energy level or other chamber conditions relative to Phase 1. In this example, adjusted Phase 2 begins around 67.5 seconds and lasts until around 135 seconds. Sensor readings and determinations about whether to proceed to a next phase may be made at regular intervals or pre-determined times. For example, sensor readings may be made a few seconds before a phase is expected to end.

Figure 4:
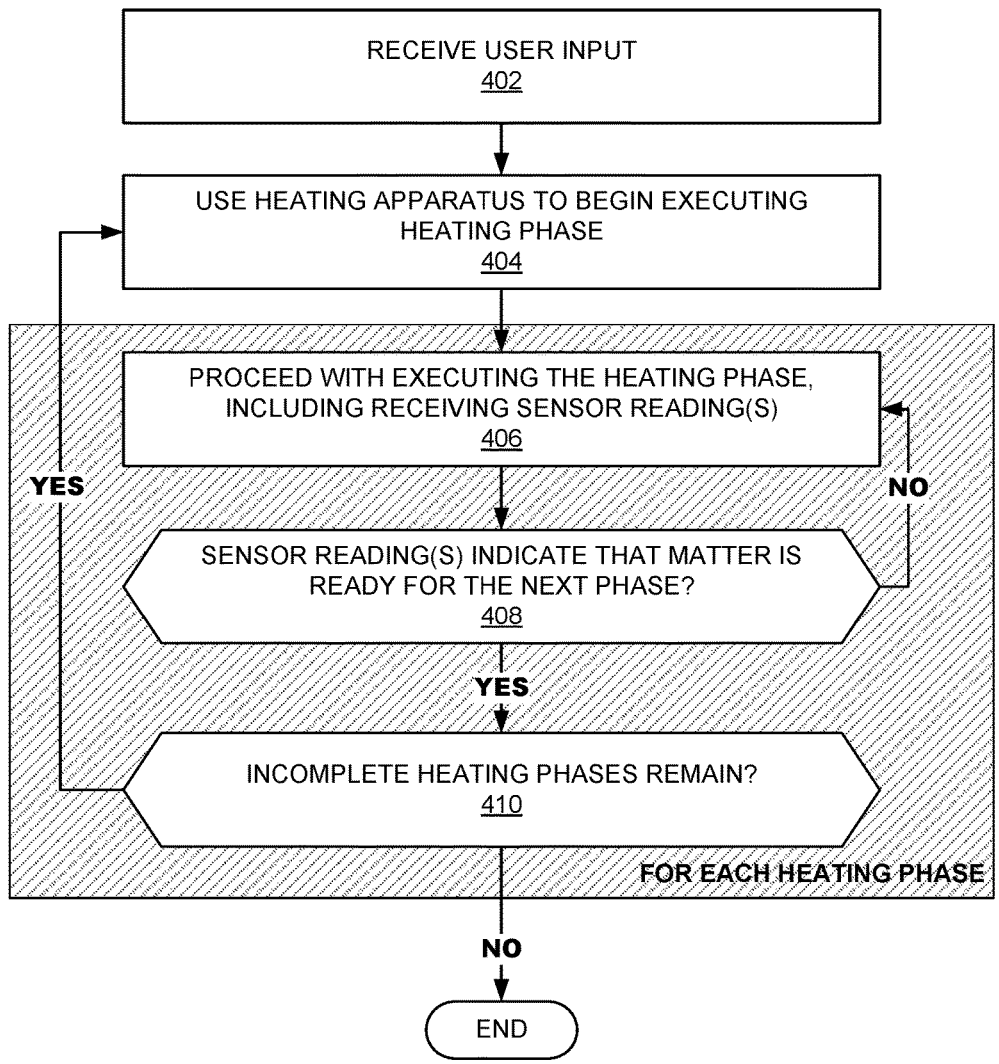
FIG. 4 is a flowchart illustrating an embodiment of a process to decode a custom cooking program based on sensor reading(s) and user input.

FIG. 4 is a flowchart illustrating an embodiment of a process 400 to decode a custom cooking program based on sensor reading(s) and user input. In various embodiments, the custom cooking program is adapted for contents of a package such as contents of package 500 of FIG. 5. In various embodiments, the process 400 may be implemented by a processor such as processor 102 of FIG. 1, controller 608 of FIG. 6, or controller 708 of FIG. 7.

At 402, user input is received. In various embodiments, the duration and/or energy level for a heating phase may be adjusted based on the user input. In some cases, one or more phases may be added or removed based on the user input. Suppose a user indicates that she prefers her steak rare. The heating phases may be assembled based on a baseline heating schedule. To customize the steak to the user's tastes (rare), one or more phases may be shortened and/or an energy level for one or more phases may be decreased by a pre-defined percentage, e.g., 10%.

At 404, a heating apparatus is used to begin executing a heating phase. An example of using a heating apparatus to begin executing a heating phase is 202 of FIG. 2.

At 406, the heating phase proceeds. In various embodiments, the execution of the heating phase includes receiving one or more sensor readings. An example of proceeding with execution of the heating phase is 204 of FIG. 2.

At 408, it is determined whether sensor readings indicate that matter is ready for the next phase. An example of determining whether matter is ready for the next phase is 206 of FIG. 2. In various embodiments, the determination of whether the matter is ready for the next phase is also based on user preferences. For example, a threshold or profile with which sensor readings are compared may be defined based on user input. For example, a threshold color for rare steak may be used if a user prefers steak cooked rare.

If the food is not ready for the next phase, the heating apparatus is instructed to extend the prescribed time to perform the current phase. The process 400 returns to 406 in which the contents of the heating apparatus are continued to be monitored by receiving sensor readings. For example, this may extend the time to perform a current phase, e.g., maintaining a current energy level, while additional sensor readings are collected. In various embodiments, a particular phase is extended subject to a time limit. For example, even if sensor readings indicate that the food is not ready for the next phase, if the time limit is met, then the process may proceed to the next phase. This may prevent food from being overcooked due to a faulty sensor reading reporting that food is not ready for the next phase.

If the food is ready for the next phase, it is determined whether any incomplete heating phases remain (410). If no incomplete heating phases remain, the process ends. If there are any incomplete heating phases, the process 400 returns to 404 in which the heating apparatus is instructed to begin executing a next heating phase.

In various embodiments, 406-140 is performed for each heating phase. In various embodiments, prior to 404, heating phases are determined based on heating instructions and user input.

For example, heating phases are determined by reading encoded heating instructions. In some embodiments, the instructions are obtained from reading an electronic tag. For example, an electronic tag reader such as reader 606 of heating apparatus 600 of FIG. 6 scans an electronic tag 524 of a package 500 of FIG. 5. In some embodiments, heating instructions are embedded in the electronic tag and an Internet connection is not needed to prepare food using the heating instructions. In some embodiments, instructions are requested from a remote server based on an identification of the packaged food. The identification of the packaged food may be determined by scanning an electronic tag such as tag 524 of package 500 of FIG. 5.

The instructions may include a heating schedule having one or more phases, each phase having a pre-defined duration and energy level. In various embodiments, heating instructions include one or more phases, duration of each phase, and energy level for each phase, etc. For example, the heating instructions may be provided as a recipe or schedule in which the food is heated at a particular temperature/energy for a defined duration of time. An example of a heating schedule is shown in FIG. 3. A baseline heating schedule may be adjusted based on user input. For example, a user preferring steak cooked rare may cause the heating schedule to be adjusted to reduce cooking time of one or more phases and/or reduce heating temperature of one or more phases.

Figure 5:
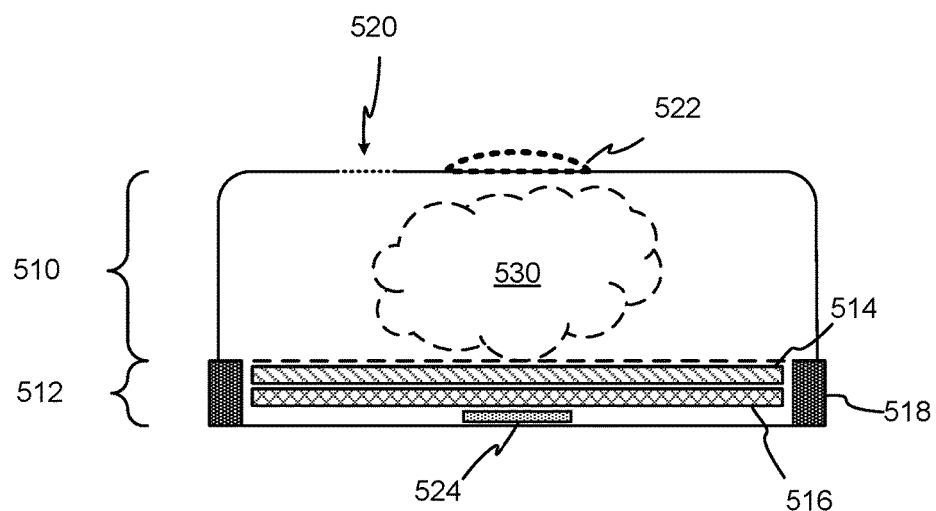
FIG. 5 is a block diagram illustrating an embodiment of an apparatus to store and transport matter.

FIG. 5 is a block diagram illustrating an embodiment of an apparatus 500 to store and transport matter 530. For example, in various embodiments the apparatus 500 is adapted to store and transport matter 530 comprising food or other heatable loads. The apparatus 500 includes a top portion 510, a bottom portion 512, a metal layer 514, a membrane 516, a seal 518, and a pressure relief valve 520.

The bottom portion 512 is adapted to receive matter 530. The bottom portion holds food or other types of loads. For example, the bottom portion may be a plate or bowl. As further described herein, a user may directly consume the matter 530 from the bottom portion 512.

The top portion 510 is adapted to fit the bottom portion 512 to form a chamber. For example, the top portion may be a cover for the bottom portion. In some embodiments, the top portion is deeper than the bottom portion and is a dome, cloche, or other shape. Although not shown, in some embodiments, the top portion is shallower than the bottom portion. In some embodiments, the top portion is transparent and the matter 530 can be observed during a preparation/heating process. In some embodiments, the chamber is at least partially opaque. For example, portions of the chamber may be opaque to prevent users from inadvertently touching the apparatus when the chamber is hot.

The top portion 110 and the bottom portion 112 may be made of a variety of materials. Materials may include glass, plastic, metal, compostable/fiber-based materials, or a combination of materials. The top portion 510 and the bottom portion 512 may be made of the same material or different materials. For example, the top portion 110 is metal while the bottom portion 112 is another material.

The seal 518 is adapted to join the top portion 510 to the bottom portion 512. In one aspect, the seal may provide an air-tight connection between the top portion and the bottom portion, defining a space enclosed within the top portion and the bottom portion. In some embodiments, in the space, matter 530 is isolated from an outside environment. The pressure inside the space may be different from atmospheric pressure. The seal may also prevent leakage and facilitate pressure buildup within the chamber in conjunction with pressure relief valve 520 and/or clamp of a heating apparatus (not shown).

In one aspect, a chamber formed by the top portion 510 and the bottom portion 512 may store and/or preserve food. For example, food may be vacuum-sealed inside the chamber. In another aspect, the chamber contains the food during a heating process. In various embodiments, the chamber can be directly be placed on a heating apparatus. For example, a user may obtain the chamber from a distributor (e.g., a grocery store), heat up the contents of the chamber without opening the chamber, and consume the contents of the chamber directly. In various embodiments, the same chamber stores/preserves food, is a transport vessel for the food, can be used to cook the food, and the food can be directly consumed from the chamber after preparation.

The metal layer 514 (also referred to as a conductive structure) heats in response to an EM source. In some embodiments, the metal layer heats by EM induction. The metal layer can heat matter 530. For example, heat in the metal layer may be conducted to the contents. As further described herein, the heating of the matter (in some cases in combination with a controlled level of moisture) in the chamber allows for a variety of preparation methods including dry heat methods such as baking/roasting, broiling, grilling, sauteing/frying; moist heat methods such as steaming, poaching/simmering, boiling; and combination methods such as braising and stewing. In various embodiments, several different heating methods are used in a single preparation process, e.g., the preparation process comprising a sequence of heating cycles.

The metal layer may be made of a variety of materials. In some embodiments, the metal layer includes an electrically conducting material such as a ferromagnetic metal, e.g., stainless steel. In various embodiments, the metal is processed and/or treated in various ways. For example, in some embodiments, the metal is ceramic-coated. In some embodiments, the metal layer is made of any metallic material, e.g., aluminum.

The membrane 516 (also referred to as a membrane region) is adapted to control an amount of liquid. For example, the membrane may provide controlled flow of moisture through the membrane. In various embodiments, the membrane may release liquids (e.g., water) inside a space defined by the top portion 510 and the bottom portion 512. For example, water can be released in a controlled manner and transformed to steam during a heating process. In various embodiments, the membrane may absorb liquids. For example, the membrane may absorb juices released by food during a heating process.

In some embodiments, the membrane 516 is adapted to provide insulation between the metal layer 514 and a surface of the bottom portion 512. For example, if the bottom portion is a glass plate, the membrane may prevent the glass plate from breaking due to heat.

The membrane 516 may be made of a variety of materials. In some embodiments, the membrane includes a heat-resistant spongy material such as open-cell silicone. In some embodiments, the membrane includes natural fiber and/or cellulose. The material may be selected based on desired performance, e.g., if the membrane is intended to absorb liquid or release liquid, a rate at which liquid should be absorbed/released, a quantity of liquid initially injected in the membrane, etc.

The pressure relief valve 520 regulates pressure in a space defined by the top portion 510 and the bottom portion 512. In various embodiments, the pressure relief valve relieves pressure buildup within the chamber. For example, in various embodiments the valve activates/deploys automatically in response to sensed temperature or pressure inside the chamber meeting a threshold. In some embodiments, the valve is activated by a heating apparatus such as heating apparatus 600 of FIG. 6. For example, the valve may be activated at a particular stage or time during a cooking process. The pressure relief valve allows the contents of the chamber to be heated at one or more pre-determined pressures including at atmospheric pressure. In various embodiments, this accommodates pressure heating techniques.

In some embodiments, the apparatus includes a handle 522. The handle may facilitate handling and transport of the apparatus. For example, the handle may enable a user to remove the apparatus from a base (e.g., from the heating apparatus 600 of FIG. 6). In various embodiments, the handle is insulated to allow safe handling of the apparatus when the rest of the apparatus is hot. In some embodiments, the handle is collapsible such that the apparatus is easily stored. For example, several apparatus may be stacked. FIG. 5 shows one example of the handle placement. The handle may be provided in other positions or locations.

In some embodiments, the apparatus includes an electronic tag 524. The electronic tag encodes information about the apparatus. By way of non-limiting example, the encoded information includes identification of matter 530, characteristics of the contents, and handling instructions. Using the example of a food package, the electronic tag may store information about the type of food inside the package (e.g., steak, fish, vegetables), characteristics of the food (e.g., age/freshness, texture, any abnormalities), and heating instructions (e.g., sear the steak at high heat followed by baking at a lower temperature). Although shown below membrane 516, the electronic tag may be provided in other locations such as below handle 522, on a wall of the top portion 510, among other places.

The apparatus 500 may be a variety of shapes and sizes. In some embodiments, the shape of the apparatus is compatible with a heating apparatus such as heating apparatus 600 of FIG. 6. For example, the apparatus may be of a suitable surface area and shape to be heated by apparatus 600. For example, apparatus 100 may be around 7 inches in diameter and around 2 inches in height.

Figure 6:
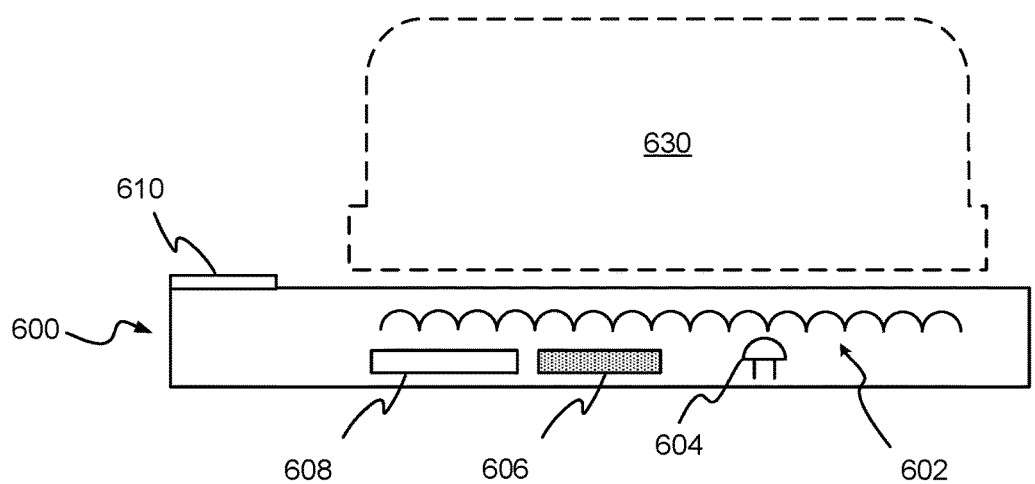
FIG. 6 is a block diagram illustrating an embodiment of an apparatus for heating.

FIG. 6 is a block diagram illustrating an embodiment of an apparatus 600 for heating. For example, in various embodiments the heating apparatus 600 is adapted to receive an apparatus 630 (also referred to as a chamber) and heat contents of the chamber 630. An example of the chamber 630 is apparatus 800 of FIG. 8. The heating apparatus 600 includes an EM source 602, one or more sensors 604, electronic tag reader 606, controller 608, and user interface 610.

The EM source 602 heats electrically conductive materials. In various embodiments, the EM source is an RF source that provides inductive heating of metals such as ferromagnetic or ferrimagnetic metals. For example, the EM source 602 may include an electromagnet and an electronic oscillator. In some embodiments, the oscillator is controlled by controller 608 to pass an alternating current (AC) through an electromagnet. The alternating magnetic field generates eddy currents in a target such as metal layer 514 of FIG. 5, causing the metal layer to heat. Heating levels and patterns may be controlled by the frequency of the AC and when to apply the AC to the electromagnet as further described herein.

The sensor(s) 604 are adapted to detect characteristics of contents of chamber 630 including any changes that may occur during a heating process. A variety of sensors may be provided including a microphone, camera, thermometer, and/or hygrometer, etc. A microphone may be configured to detect sounds of the matter being heated. A camera may be configured to detect changes in the appearance of the matter being heated, e.g., by capturing images of the matter. A hygrometer may be configured to detect steam/vapor content of the chamber. For example, the hygrometer may be provided near an opening or pressure relief valve such as valve 520 of FIG. 5 to detect moisture escaping the chamber. The information captured by the sensors may be processed by controller 608 to determine a stage in the cooking process or a characteristic of the matter being heated as further described herein. In this example, the sensor(s) are shown outside the chamber 630. In some embodiments, at least some of the sensor(s) are provided inside the chamber 630.

The electronic tag reader 606 reads information about contents of the chamber 630 such as characteristics of packaged food. The information encoded in the tag may include properties of the contents, instructions for preparing/heating the contents, etc. In various embodiments, the electronic tag reader is configured to read a variety of tag types including barcodes, QR codes, RFIDs and any other tags encoding information.

The controller 608 controls operation of the heating apparatus 600. An example of the controller is controller 708 of FIG. 7. In various embodiments, the controller executes instructions for processing contents of chamber 630. In some embodiments, the instructions are obtained from reading an electronic tag of the chamber 630 via the electronic tag reader 606. In some embodiments, the controller requests instructions from a remote server based on the contents. The controller controls the EM source 602 to implement heating levels and patterns, e.g., activating the electromagnet to carry out the heating instructions.

In some embodiments, the apparatus includes one or more network interfaces (not shown). A network interface allows controller 608 to be coupled to another computer, computer network, or telecommunications network using a network connection as shown. For example, through the network interface, the controller 608 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) controller 608 can be used to connect the heating apparatus 600 to an external network and transfer data according to standard protocols. For example, various process embodiments disclosed herein can be executed on controller 608, or can be performed across a network such as the Internet, intranet networks, or local area networks, in conjunction with a remote processor that shares a portion of the processing. Additional mass storage devices (not shown) can also be connected to controller 608 through the network interface.

In some embodiments, the apparatus includes one or more I/O devices 610. An I/O device interface can be used in conjunction with heating apparatus 600. The I/O device interface can include general and customized interfaces that allow the controller 608 to send and receive data from other devices such as sensors, microphones, touch-sensitive displays, transducer card readers, tape readers, voice or handwriting recognizers, biometrics readers, cameras, portable mass storage devices, and other computers.

The user interface 610 is configured to receive user input and/or provide information to a user. For example, the user interface may be suitable for receiving user input at 604 of FIG. 6. In various embodiments, the user interface 610 is a touch-sensitive screen. For example, various options for food preparation may be displayed on the touch screen. The user interface may transmit a user's selection to a processor such as controller 608. The processor then determines a heating schedule based at least in part on the user selection.

In various embodiments, controller 608 is coupled bi-directionally with memory (not shown), which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on controller 608. Also as is well known in the art, primary storage typically includes basic operating instructions, program code, data and objects used by the controller 608 to perform its functions (e.g., programmed instructions). For example, memory can include any suitable computer-readable storage media, described below, depending on whether, for example, data access needs to be bi-directional or uni-directional. For example, controller 608 can also directly and very rapidly retrieve and store frequently needed data in a cache memory (not shown).

In some embodiments, the controller implements the heating instructions based on sensor readings. The controller may determine that a heating stage is complete, e.g., the food has reached a desired state, based on sensor readings. For example, when a level of moisture inside the chamber 630 drops below a threshold, a Maillard reaction begins and the food becomes browned. The Maillard reaction may be indicated by a characteristic sound (e.g., sizzling). For example, in various embodiments, the controller determines a characteristic of the food being prepared using signals collected by the sensor(s) 604. The controller receives a sensor reading from the microphone and/or other sensors and determines that the Maillard reaction has begun based on the sensor reading meeting a threshold or matching a profile. For example, the color of food may indicate whether the food has been cooked to satisfaction. The controller receives a sensor reading from the camera and/or other sensors and determines that food has been cooked to a desired level of tenderness based on the sensor reading meeting a threshold or matching a profile.

The controller may adjust a heating stage or a heating power level based on sensor readings. For example, in various embodiments at the end of a default heating time indicated by heating instructions, the controller checks sensor readings. The sensor readings indicate that the food is not sufficiently browned. The controller may then extend the heating time such that the food is more browned.

In various embodiments, the heating apparatus includes a cradle or support for apparatus 100. For example, the support may be separated from the heating apparatus, the apparatus 100 inserted into the support, and the support returned to the heating apparatus. The support may support a circumference/walls of apparatus 100.

In various embodiments, the heating apparatus includes a switch (not shown). The switch may power on the heating apparatus and/or receive user input to begin a heating process. In various embodiments, the switch is provided with a visual indicator of progress of a heating process. For example, the switch may be provided at the center of a light "bulb," where the light bulb includes one or more colored lights (e.g., LED lights). The light "bulb" may change colors during the heating process, acting like a timer. For example, at the beginning of a heating process, the bulb is entirely be red. As the heating process progresses, the light gradually turns green (e.g., segment by segment) until the light is entirely green, indicating completion of a heating stage or heating process. The light may gradually turn green segment by segment as if with the sweeping of a second hand of a clock, where a section to the left of the hour and minutes hands is red and a section to the right of the hour and minute hands is green until both hands are at 12:00 and the bulb is entirely green.

In various embodiments, the heating apparatus may include a user interface to display and/or receive user input. For example, a current power/energy level of a heating phase may be displayed on the user interface. In some embodiments, the energy levels are categorized Level 1 to Level 6 and a current power level of a heating phase is displayed on the user interface. The categorization may facilitate user comprehension of the energy level. Power/energy levels may be represented in an analog or continuous manner in some embodiments.

The heating apparatus 600 may be a variety of shapes. For example, heating apparatus 600 may be around 9 inches in diameter and around 2 inches in height. In some embodiments, the shape of the apparatus is compatible with an apparatus such as chamber 500 of FIG. 5. For example, the apparatus may be of a suitable surface area and shape to heat the contents of chamber 500.

Figure 7:
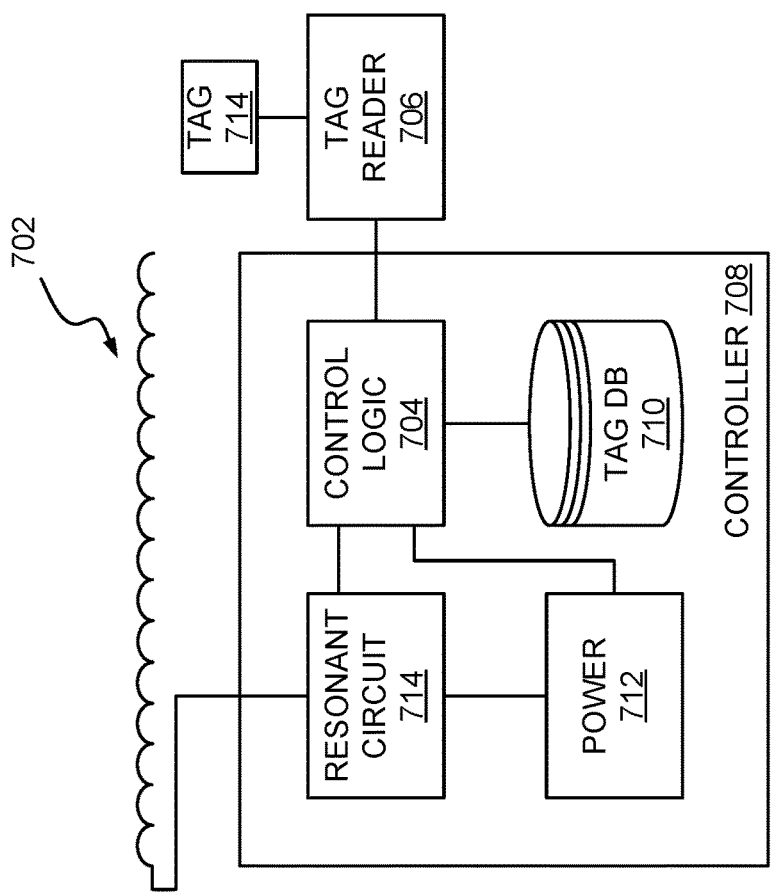
FIG. 7 is a block diagram of an embodiment of a controller for a heating apparatus.

FIG. 7 is a block diagram of an embodiment of a controller 708 for a heating apparatus. For example, the controller may be provided in heating apparatus 600 of FIG. 6. The controller 708 includes control logic 704, a tag database 710, resonant circuit 714, and power 712. In this example, the controller 708 is communicatively coupled to EM source 702 and tag reader 706.

The tag reader 706 reads a tag 714. The tag 714 may encode information about contents of a chamber. An example of tag reader 706 is electronic tag reader 606 of FIG. 6.

The control logic 704 is configured to receive tag information from the tag reader 706 and determine one or more heating cycles based on the tag information. In some embodiments, the control logic determines heating cycle(s) by looking up an association between the tag information and stored heating cycles. For example, the control logic may determine heating cycle(s) adapted to properties of a chamber in which the heatable load is provided and/or characteristics of the heatable load. In various embodiments, the control logic executes one or more processes described herein including processes shown in FIG. 2, 4, or 8.

In some embodiments, the control logic is implemented by one or more processors (also referred to as a microprocessor subsystem or a central processing unit (CPU)). For example, the control logic 704 can be implemented by a single-chip processor or by multiple processors. In some embodiments, a processor is a general purpose digital processor that controls the operation of the heating apparatus 600. Using instructions retrieved from memory, the processor controls the reception and manipulation of input data, and the output and display of data on output devices (e.g., display 118 of FIG. 1 or user interface 610 of FIG. 6).

The tag database 710 stores associations between heatable loads and heating cycles. For example, energy level, duration, and other properties of heating cycles may be stored in association with a load or characteristic(s) the load. In various embodiments, the associations are pre-defined and loaded into the database. In various embodiments, the associations are refined based on machine learning, user feedback, and/or sensor readings of heatable load properties before, during, or after a heating cycle. Although shown as part of the controller 708, the tag database may instead be external to the controller.

The resonant circuit 714 controls the EM source 702. In some embodiments, the resonant circuit 714 has an integrated EM source 702, e.g., an inductor coil (not shown). In some embodiments, the EM source is a separate element from the resonant circuit 714.

The power 712 is input to the resonant circuit 714. In various embodiments, power 712 is a DC source. The DC source may be an internal or external DC source or may be adapted from an external AC source. Although shown as an internal source, the power may instead be external to the controller 708.

In operation, tag reader 706 read tag information from tag 714, and sends the information to the control logic 704. The control logic 704 maps the received tag information to one or more heating cycles using associations stored in tag database 710. The control logic 704 then instructs the resonant circuit 714 to execute the heating cycles. For example, the control logic 704 may also control when power 712 is provided to the resonant circuit 714. Resonant circuit 714 then activates the EM source 702.

Figure 8:
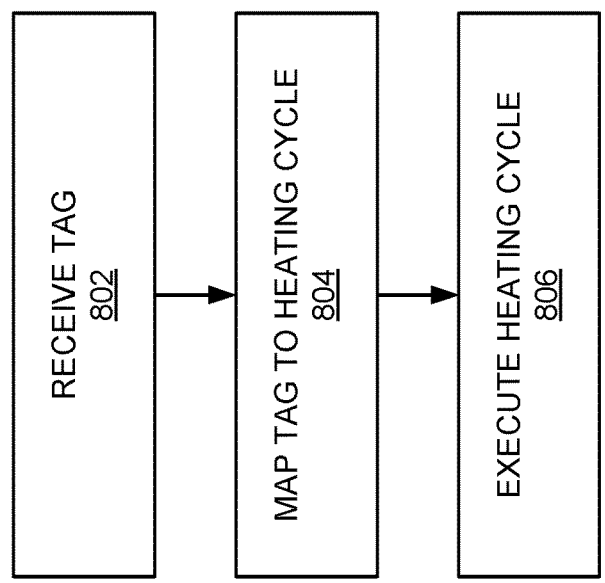
FIG. 8 is a flowchart illustrating an embodiment of a process to operate an automatic heating system.

FIG. 8 is a flowchart illustrating an embodiment of a process 800 to operate an automatic heating system. In various embodiments, the process 800 may be implemented by a processor such as control logic 704 of FIG. 7.

A tag is received (802). In various embodiments, the tag is an electronic tag associated with a heatable load. Tag 524 of FIG. 5 is an example of a tag encoding information about matter 530. Returning to FIG. 8, the tag is mapped to a heating cycle (804). In various embodiments, the tag is mapped by looking up an association between the tag and heating cycles. The heating cycles may be adapted for characteristics of a heatable load. The heating cycle may be defined by a duration and an energy level as further described herein. Upon determination of one or more heating cycles, the heating cycle(s) is executed (806). For example, in various embodiments control logic instructs a resonant circuit, e.g., 714 of FIG. 7, to drive an EM source, e.g., 702 of FIG. 7.

FIG. 9A is a block diagram illustrating an embodiment of a modular heating system 900. The system 900 includes a plurality of sub-units (labelled as "devices"). In this example, the sub-units of the system are heating apparatus, e.g., N heating apparatus. An example of a heating apparatus is heating apparatus 600 of FIG. 6. In various embodiments, the sub-units are communicatively coupled to at least their adjacent sub-units. For example, the sub-units may communicate by wired or wireless means such as Bluetooth®, Wi-Fi®, and/or other local area network protocols. For example, in various embodiments, the sub-units each have a network interface such as the network interface described with respect to FIG. 6.

The sub-units may be configured to coordinate operation such that the system operates as a single unit. For example, one of the sub-units may be appointed as a master and communicate with the other slave sub-units of the system. If the master is removed from the system, another sub-unit may be appointed as the master. As another example, each of the sub-units may be instructed to operate (e.g., delay beginning of a heating cycle) by a central server.

The system 900 is expandable and accommodates sub-units that may be added or removed after an initial set-up. For example, the heating apparatus need not be acquired at the same time. When a heating apparatus is added to the system, the heating apparatus is automatically configured to communicate and coordinate with the other heating apparatus as further described herein. When a heating apparatus is removed from the system, the system is automatically updated.

In various embodiments, one or more sub-units of system 900 is configured to coordinate meal preparation. For example, the heating apparatus may be configured to finish heating at the same time. Those heating apparatus with contents having shorter heating times may delay the start time such that more than one of the heating apparatus finish at the same time. Suppose Device 1 is instructed to cook steak, which takes 3 minutes, Device 2 is instructed to cook spinach, which takes 1 minute, and Device N is instructed to cook mashed potatoes, which takes 1.5 minutes. Device 1 begins first, 1.5 minutes later, Device N begins, and 30 seconds after Device N begins, Device 2 begins. Thus, Devices 1, 2, and N will finish heating at the same time.

As another example, the devices may be configured to finish heating at staggered times. Using the same example in which Device 1 is instructed to cook steak, which takes 3 minutes, Device 2 is instructed to cook spinach, which takes 1 minute, and Device N is instructed to cook mashed potatoes, which takes 1.5 minutes, suppose mashed potatoes need more time to cool down. Devices 1 and 2 may be configured to finish at the same time, and Device N may be configured to finish 1 minute before Devices 1 and 2 finish. Device 1 begins first, 0.5 minutes later, Device N begins, and 1.5 minutes after Device N begins, Device 2 begins. Thus, Devices 1 and 2 will finish heating at the same time (3 minutes after Device 1 began) and Device N will finish heating 1 minute before Devices 1 and 2 are finished.

FIG. 9B is a block diagram illustrating an embodiment of a modular heating system 950. The system 950 includes a plurality of sub-units (labelled as "devices"). In this example, the sub-units of the system are modules, e.g., N modules. Each of the modules includes four heating apparatus, Device 1 to Device 4. An example of a heating apparatus is heating apparatus 600 of FIG. 6. In various embodiments, the sub-units are communicatively coupled to at least their adjacent sub-units. For example, the sub-units may communicate by wired or wireless means such as Bluetooth®, Wi-Fi®, and/or other local area network protocols. For example, in various embodiments, the sub-units each have a network interface such as the network interface described with respect to FIG. 2.

In various embodiments, the modules may be configured to coordinate operation of constituent heating apparatus. For examples, Device 1 to Device 4 are configured to finish heating at the same time or pre-defined staggered finish times. In various embodiments, the modules may be configured to coordinate operation with each other. For example, Modules 1 to N are coordinated to finish heating at the same time or pre-defined staggered finish times.

Suppose system 950 is preparing a meal for two people, where each meal includes four courses. Each of the courses may be packaged in a chamber such as apparatus 500 of FIG. 5. In some embodiments, the chambers may be loaded into the devices at the same time and configured to be finished heating at pre-defined times (e.g., at the same time or pre-selected staggered times).

There are a variety of ways to load the chambers into the devices/modules. In a first example, each of the courses for the first person is inserted into a respective device in Module 1. Each of the courses for the second person is inserted into a respective device in Module 2. For example, Device 1 in each module receives a package for a starter, Device 2 in each module receives a package for an intermediate course, Device 3 in each module receives a package for a main course, and Device 4 in each module receives a package for a dessert. The packages may all be inserted into the heating apparatus at the same time.

In a second example, courses of the same type are inserted into the same module. For example, a starter package is inserted into Device 1 and Device 2 of Module 1, an intermediate course package is inserted into Device 3 and Device 4 of Module 1, a main course package is inserted into Device 1 and Device 2 of Module 2, and a dessert package is inserted into Device 3 and Device 4 of Module 2.

In operation, the modules may coordinate to finish cooking the starter first, finish cooking the intermediate course 10 minutes after cooking of the starter is completed, finish cooking the main course 15 minutes after cooking of the intermediate course is completed, and finish cooking the dessert 20 minutes after cooking of the main course is completed. The modules may factor in the time is takes to prepare each of the courses in determining when to begin cooking each of the courses to meet the defined finish time. The end times may be adapted to a user, e.g., based on usage habits and/or preferences provided by a user or associated with a user profile. In various embodiments, the heating apparatus is configured for use in a top-loading manner (e.g., like loading matter into a pot or pan on a cooktop). In various embodiments, the heating apparatus is configured for use in a side-loading manner (e.g., like loading matter into a conventional oven).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of heating food, comprising:
  using a heating apparatus to execute a first phase of a plurality of heating phases, the first phase having an associated prescribed time to perform the first phase, wherein the heating apparatus is adapted to receive the food in a package, the package including:
    an electrically conductive structure adapted to receive electromagnetic energy from an electromagnetic source and produce heat, and
    a membrane below and thermally coupled to the electrically conductive structure, the membrane containing moisture and adapted to provide controlled flow of moisture through the membrane when heated;
  determining a state of the food based at least in part on at least one sensor reading of the food associated with the first phase;

if the determined state indicates that the first heating phase is completed, proceeding to a next phase of the plurality of heating phases;

if the at least one sensor reading indicates that the first heating phase is not completed, instructing the heating apparatus to extend the prescribed time to perform the first phase, and using the membrane to introduce moisture into the heating apparatus based at least in part on the determined state.

2. The method of claim 1, further comprising:

reading heating instructions encoded in an electronic tag; and determining a sequence of heating phases based on the read instructions.

3. The method of claim 2, wherein the reading the heating instructions includes scanning the electronic tag.

4. The method of claim 2, wherein the electronic tag is an RFID tag.

5. The method of claim 2, wherein the electronic tag includes a link to instructions stored in a remote server.

6. The method of claim 1, wherein the heating apparatus includes the electromagnetic source.

7. The method of claim 1, wherein the heating phases includes at least one of: a number phases, a duration of each of the phases, and an energy level of each of the phases.

8. The method of claim 1, wherein the heating apparatus is part of a system including a plurality of heating apparatuses; and further comprising executing the plurality of heating phases in a manner determined to coordinate with other ones of the heating apparatuses.

9. The method of claim 8, further comprising executing the plurality of heating phases in a manner determined to cause the heating apparatus and at least one of the other ones of the heating apparatuses to complete cooking at substantially the same time.

10. The method of claim 1, wherein the at least one sensor reading includes data collected by a camera.

11. The method of claim 1, wherein the at least one sensor reading includes a sound indicating a Maillard reaction based at least in part on data collected by a microphone.

12. The method of claim 1, wherein the at least one sensor reading includes data collected by a thermometer.

13. The method of claim 1, wherein the at least one sensor reading includes data collected by a barometer.

14. The method of claim 1, wherein the at least one sensor reading includes data collected by a hygrometer.

15. The method of claim 1, wherein the at least one sensor reading includes data collected by a radar.

16. The method of claim 1, wherein the instructing the heating apparatus to extend a time to perform the first phase is subject to a pre-defined limit.

17. The method of claim 1, further comprising:

receiving user input during a cooking process; and modifying the plurality of heating phases based on the received user input.

18. The method of claim 1, further comprising modifying the plurality of heating phases based on historical user preferences.

19. The method of claim 1, wherein the first phase includes dry heat and the next phase includes introducing moisture into the heating apparatus.

* * * * *